United States Patent
Di Maio et al.

(10) Patent No.: US 7,050,280 B2
(45) Date of Patent: May 23, 2006

(54) HIGH SPEED TRANSFER SYSTEM

(75) Inventors: Luciano Di Maio, Milan (IT); Ralf Krumm, Schwetzingen (DE); Andrea Andenna, Annico (IT); Fabio Gatelli, Bagnolo-Mella (IT); Andrea Crespi, Gallarate (IT)

(73) Assignee: ABB Technology AG, Zurich (CH)

( * ) Notice: Subject to any disclaimer, the term of this patent is extended or adjusted under 35 U.S.C. 154(b) by 56 days.

(21) Appl. No.: 10/500,029

(22) PCT Filed: Dec. 27, 2002

(86) PCT No.: PCT/EP02/14889

§ 371 (c)(1),
(2), (4) Date: Jun. 24, 2004

(87) PCT Pub. No.: WO03/056679

PCT Pub. Date: Jul. 10, 2003

(65) Prior Publication Data

US 2005/0007714 A1    Jan. 13, 2005

(30) Foreign Application Priority Data

Dec. 31, 2001 (EP) .................................. 01205188

(51) Int. Cl.
*H02H 3/08* (2006.01)
*H02H 9/02* (2006.01)

(52) U.S. Cl. ........................ 361/93.1; 361/62; 361/66; 361/115

(58) Field of Classification Search ................ 361/93.1
See application file for complete search history.

(56) References Cited

U.S. PATENT DOCUMENTS

| | | | | |
|---|---|---|---|---|
| 5,457,729 A | * | 10/1995 | Hamann et al. | 379/2 |
| 5,612,579 A | * | 3/1997 | Wisbey et al. | 307/18 |
| 6,005,757 A | * | 12/1999 | Shvach et al. | 361/64 |
| 6,212,049 B1 | * | 4/2001 | Spencer et al. | 361/64 |
| 6,496,342 B1 | | 12/2002 | Horvath et al. | |
| 6,801,792 B1 | * | 10/2004 | Schuster et al. | 455/566 |

FOREIGN PATENT DOCUMENTS

WO    WO 00/48284    8/2000

OTHER PUBLICATIONS

Gilber, J. G. "Application of Programmable Logic Controllers to Substation Control and Protection." IEEE Transactions on Power Delivery, vol. No. 1, pp. 384-393. New York, NY U.S.A., Jan. 1994.

* cited by examiner

*Primary Examiner*—Stephen W. Jackson
*Assistant Examiner*—Dharti H. Patel
(74) *Attorney, Agent, or Firm*—Connolly Bove Lodge & Hutz LLP; Larry J. Hume

(57) ABSTRACT

A High Speed Transfer System which comprises three Protection and Control devices. A first and a second of said Protection and Control devices are used for failure detection on the feeder bus-bar; the third of said Protection and Control devices is used for the High Speed Transfer System co-ordination functionalities.

5 Claims, 4 Drawing Sheets

→ Communication through optical ports
↔ Communication through binary I/Os

HIGH SPEED TRANSFER SYSTEM

The present invention relates to a high speed transfer system for Electrical Distribution, and, in particular, to a high speed transfer system for Protection & Control of distribution networks.

The typical architecture of a High Speed Transfer System is showed in FIG. 3, in which a single device implements the High Speed Transfer System function.

In particular, specific devices protect the two feeders bus-bar by implementing specific protection functions.

In case of a failure on one feeder bus-bar, such devices send a trigger, via conventional input channels, to the High Speed Transfer System device which elaborates this information together with other information regarding the bus-bar voltages. As the voltages are such to act on the switchgear then the High Speed Transfer System device acts it.

This device is able to acquire the digital and analogic input signals by means of different electronic boards that have a DSP processor on them. Moreover it must process the entire High Speed Transfer System logic in order to send the right output to the switchgears.

In order to face the temporal constraints due to the characteristic electric system transients, such a device is very powerful from the point of view of the hardware components.

In some cases it is possible to implement on such device even the protection functions. This is possible because the hardware allows it to do that.

The High Speed Transfer System devices currently used have however some disadvantages, which are highlighted below.

The High Speed Transfer System devices currently used nowadays are usually very expensive because they need a great hardware power;

The communication among this device and the protection devices is not very fast;

The hardware and the software requirements of this device are not very efficient. To provide for this shortage, it is necessary to increase the power of the hardware components with a consequent cost increase;

A device structured in such a way is not very flexible in terms of configuration for its customization. That means that the customer can modify its configuration only with difficulties, and only after it has been installed on the field.

The High Speed Transfer System logic is moreover based on one function block execution cycle. There can be more than one cycles, with different priorities, but the architecture is anyway simply cyclic. This implies to improve the hardware performances to face the temporal constraints. Consequently the hardware complexity needs to be increased, with a corresponding increase of its costs.

SUMMARY OF THE INVENTION

The goal of the present invention consists in the realization of an improved High Speed Transfer System and devices.

This goal is achieved by realizing a new High Speed Transfer System in which three Protection and Control devices are used, instead of the single one described in the previous sections. Two of the three Protection and Control devices are used as protection of the feeder bus-bar and the third one for the switchgear co-ordination.

Moreover in this new system an efficient software High Speed Transfer System logic management is implemented, by splitting such logic into two parts: one is implemented with cycles and the other one by means of events, or asynchronous respect the cycle part.

DETAILED DESCRIPTION

Figure 1:
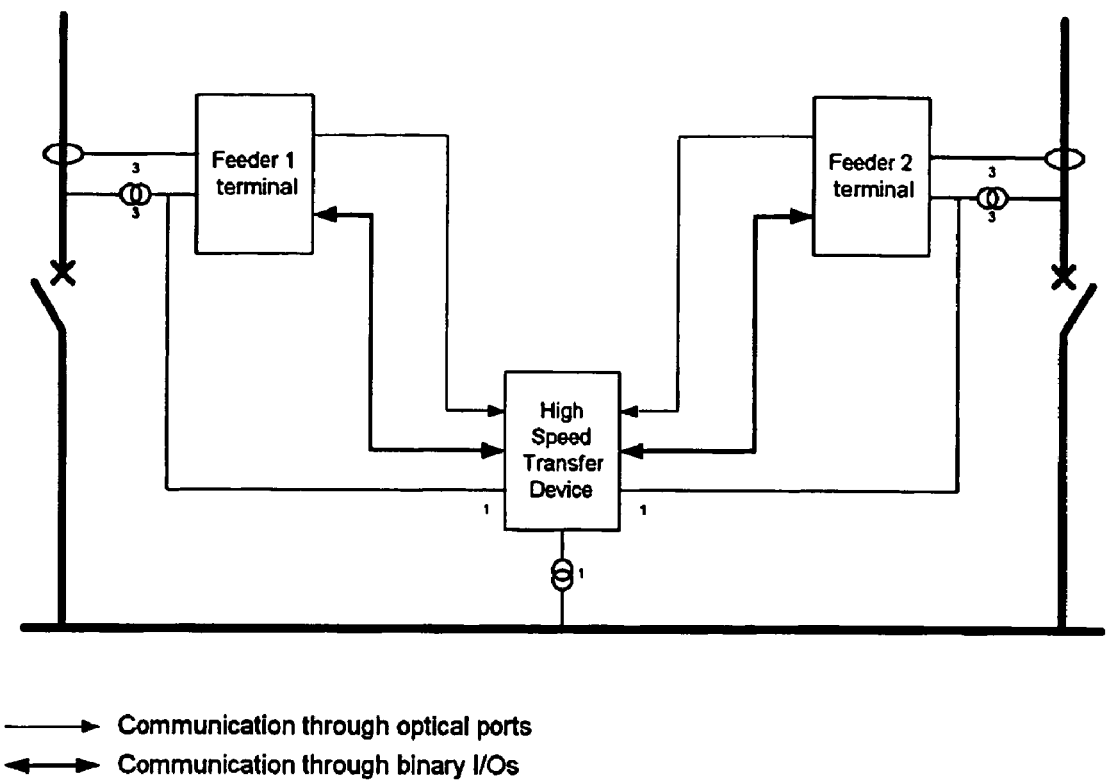
FIG. 1 illustrates an embodiment of a high-speed transfer system utilizing a logic funtion.
Figure 2:
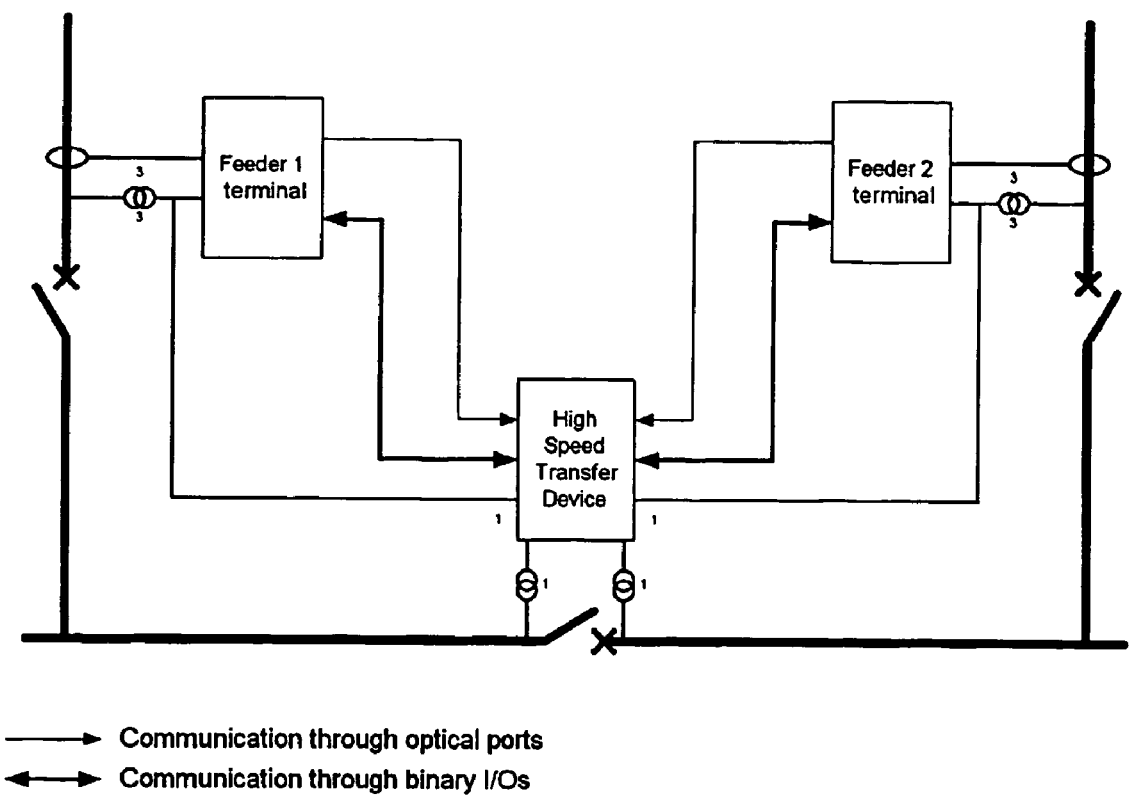
FIG. 2 illustrates the high-speed transfer system utilizing a different logic function than in FIG. 1.
Figure 3:
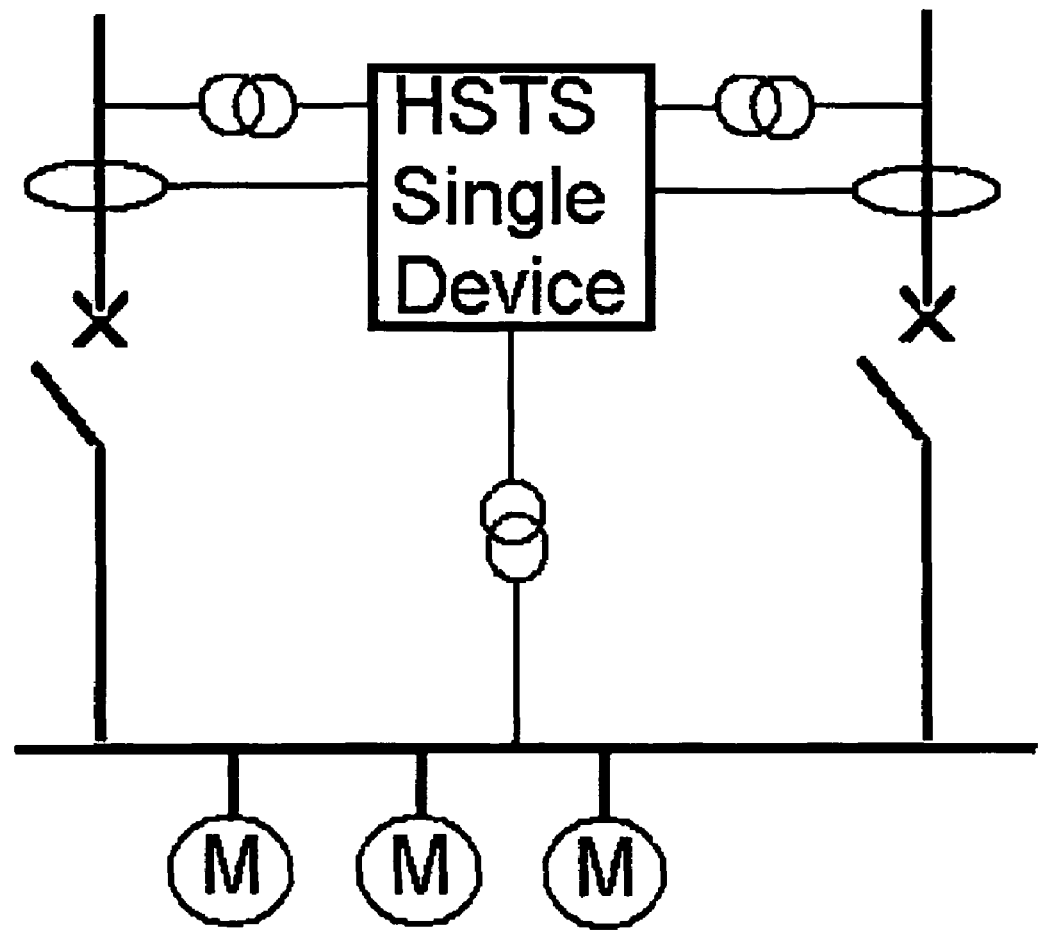
FIG. 3 illustrates conventional architecture of a high-speed transfer system.
Figure 4:
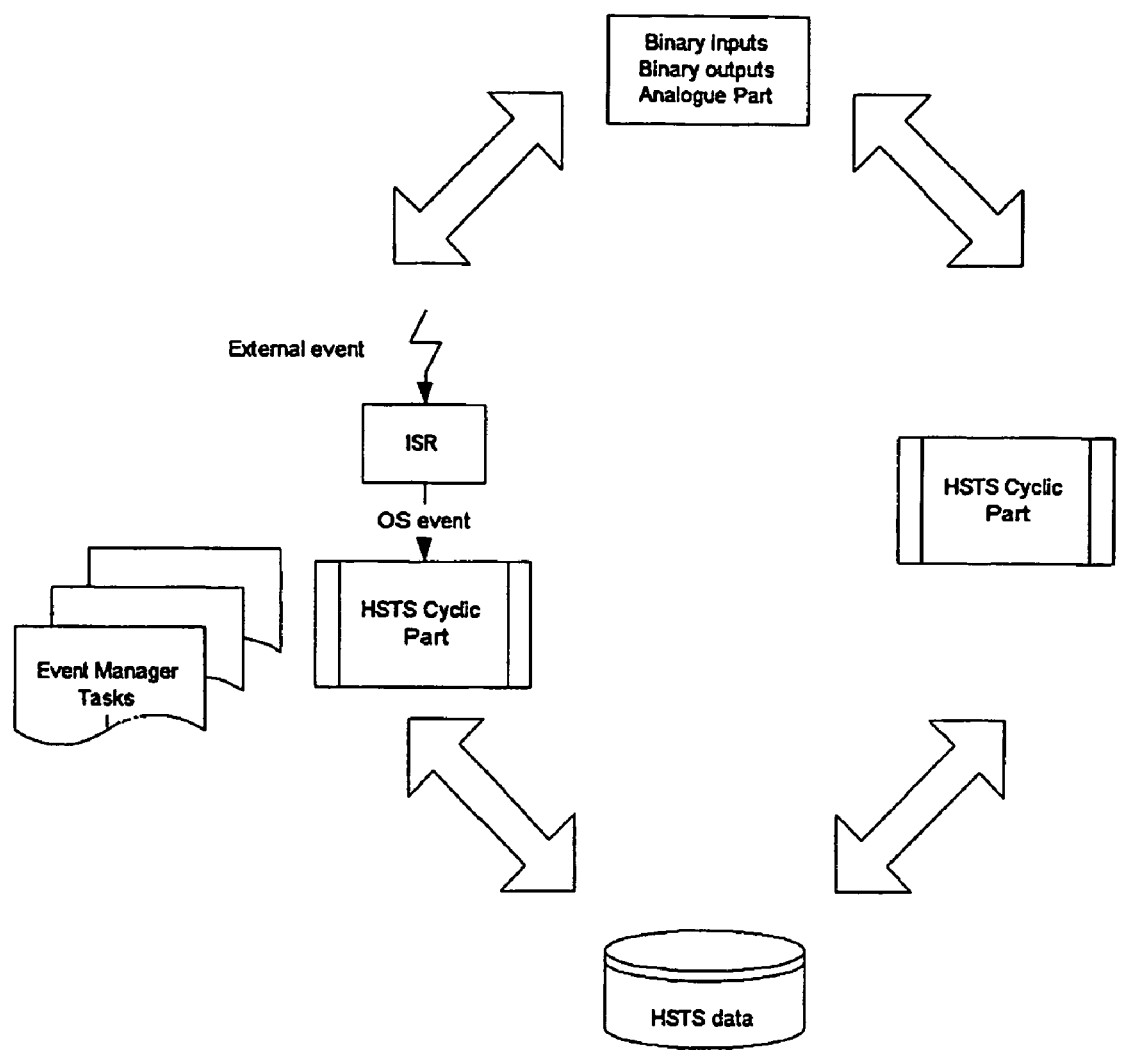
FIG. 4 illustrates a software architecture useful in an aspect of an embodiment of a high-speed transfer system.

The invention will be now described in details with reference to the enclosed FIGS. 1, 2 and 4.

Referring to FIG. 1 and FIG. 2 it is possible to see the architecture of the three Protection and Control devices.

The two feeder Protection and Control devices acquire from the feeder bus-bar the current and voltage measures in order to detect any possible failure on these bus-bar.

The same voltage measures are acquired also from the third Protection and Control device, which realizes the High Speed Transfer System co-ordination. Such measures are necessary in order to identify the right instant time in which any switchgear operation must be carried out.

The two feeder Protection and Control devices communicate to the High Speed Transfer System device any possible failure, for instance via optical cable as communication media.

An additional digital communication channel is used for the service communication among the different devices.

The software architecture of the third Protection and Control device, i.e. the one realizing the High Speed Transfer System co-ordination, is structured in order to allow both the cyclic execution of specific tasks within their temporal constraints and the quick re-action to external events.

Some of the advantages of this High Speed Transfer System according to the present invention are reported below:

The entire system is certainly cheaper than the system currently used in the art, since in the system according to the present invention use is made of three cheaper devices that do not require a great hardware power. In fact all the different High Speed Transfer System functionalities are distributed on the three devices, which communicate among them.

The communication among the three devices, for the High Speed Transfer System scope, is very fast because optical cable can be used so to have a wide band communication channel. This implies that the software has less temporal constraints because the acquired information from the High Speed Transfer System Protection and Control device are available sooner and consequently there is more time to process such informations.

The hardware and software structure of these devices is very efficient. The hardware structure is just able to perform the High Speed Transfer System proper working functionalities. In particular the software structure is very efficient. In fact it is structured in two parts: one of which is performed in software cycles while the other one is performed with events. This solution allows to face the temporal constraints due to the electric transients.

Finally the system according to the present invention is very flexible in terms of configuration and consequently in terms of customization. In fact the software is configurable in an easy way from the Human Machine Interface of each Protection and Control device, by implementating the specific functionality on each of them.

A detailed description of the functionality is given in FIG. 1 and in FIG. 2. Each of the feeder Protection and Control device acquires from the feeder bus-bar the current and voltage measures in order to detect any possible failure on these bus-bar. Such failure is detected by implementing specific protection functions able to distinguish the direction of such a failure. In fact for failure of the electric loads the High Speed Transfer System does not have to intervene. The same voltage measures are acquired also from the third Protection and Control device, which realizes the High Speed Transfer System co-ordination. Such measures are necessary in order to identify the right instant time in which any switchgear operation must be carried out. This is carried out to reduce as much as possible any current and voltage overbump.

The High Speed Transfer System logic is different for the two cases represented in FIG. 1 and FIG. 2.

In the case represented in FIG. 1, as a failure occurs on the active feeder bus-bar, the corresponding feeder Protection and Control device sends to the High Speed Transfer System Protection and Control device a trigger signal, e.g. via an optical cable.

Such trigger signal is treated as an event from the High Speed Transfer System Protection and Control device, so it is instantaneously considered from the software running on this device. The software processes such information in parallel to the rest of the High Speed Transfer System functionalities, so to manage in the most efficient way all the other High Speed Transfer System functionalities that must be carried out anyway.

As the right instant time for the switchgears operation occurs, then this device co-ordinates the opening of the switchgear on the feeder bus-bar on which the failure occurred and closes the other one so to guarantee the power feeder to the electric loads.

Then the High Speed Transfer System Protection and Control device send to the two feeder Protection and Control devices an information regarding the changed configuration of the electric system so to inform them about that. In this way these two devices can interpretate in the right way the changing of the current and voltage measures due to the closure and opening of the two switchgears. In the case of FIG. 2 both the feeder bus-bar are active until on one of them a failure occurs. Even in this case the regarding feeder Protection and Control device sends to the High Speed Transfer System Protection and Control device a trigger signal via the optical cable. Such trigger signal is treated as an event from the High Speed Transfer System Protection and Control device so it is instantaneously considered from the software running on this device. The software processes such an information in parallel to the rest of the High Speed Transfer System functionalities so to manage in the most efficient way all the other High Speed Transfer System functionalities that must be carried out anyway.

As the right instant time for the switchgears operation occurs, then this device co-ordinates the opening of the switchgear on the feeder bus-bar on which the failure occurred and closes the switchgear on the bus-bar on which the whole electric loads are connected, so to guarantee the power feeder to those electric loads previously connected with the failured feeder bus-bar.

Then the High Speed Transfer System Protection and Control device sends to the two feeder Protection and Control devices an information regarding the changed configuration of the electric system so to inform them about that. In this way these two devices can interpretate in the right way the changing of the current and voltage measures due to the closure and opening of the two switchgear.

The difference between the two cases consists on the logic configured so to manage in the opportune way the three switchgears: the operation regard a couple of switchgears at a time.

Finally the digital communication via binary I/O is used to exchange service information among the three devices such as current and voltage measures, start and trip protection information, etc.

With reference to the software architecture of the third Protection and Control device, i.e. the one realizing the High Speed Transfer System co-ordination, is structured in order to allow both the cyclic execution of specific tasks within their temporal constraints, i.e. the High Speed Transfer System cyclic part, and the quick re-action to external events, i.e. the High Speed Transfer System event-driven part. These two types of processes are shown in FIG. 4.

Both of them have to interact with data structures and external interfaces, e.g. the analog and digital I/O, the analog part of the High Speed Transfer System algorithm.

High Speed Transfer System cyclic part containing part of the High Speed Transfer System logic, e.g. switchgears opening logic, has to be periodically executed within particular temporal constraints, for instance 10-15 ms. In each cycle all the inputs are acquired, every function block, composing this part of the High Speed Transfer System logic, is executed and then the outputs signal are actuated. It is very important that the time interval needed to complete a single cycle is less than a given maximum value in order to keep real time constraints.

High Speed Transfer System event-driven part contains all those part of the High Speed Transfer System logic that can not be executed in the Cyclic part.

This can be:

that part of High Speed Transfer System logic that must be executed in correspondence of specific events, which need a fast re-action time, in particular a re-action time less of the cyclic part. If this part of logic were implemented in the cyclic part its time re-action constraint would not be met.

that part of High Speed Transfer System logic that could be executed as cyclic part but that would compromise the cyclic part time constraints.

In order to fulfill these requirements, a software architecture as shown in FIG. 4 can be used.

Let's suppose that an external event happens. An interrupt service routine is executed; it generates on its turn an operating system event in order to awake a specific task able to manage this specific external event just happened. The operating system scheduler then will execute this task depending on its priority with respect to the other tasks.

Managing external events directly in the interrupt service routine (ISR) is not feasible because in this case no different priorities could be assigned to event managers. In this case all event managers would always have a priority higher then the cyclic part one. This would compromise the time constraints of the cyclic part.

For example, in case of "fast transfer trigger from High Speed Transfer System analog part" external event, the priority of the corresponding event manager task is higher than the cyclic part so that, in fact, this event interrupts the cyclic part. In this case the event manager task is completely executed and then the cyclic part execution is continued.

Instead in those cases in which the event manager has to be executed with a priority lower than the cyclic part one, the event manger task is executed after the end of the cyclic part.

The invention is claimed is:

1. A high speed transfer system, comprising:
   three protection and control devices,
   wherein a first and a second one of said protection and control devices detect failures on respective first and second feeder bus-bars,
   wherein, responsive to a detection of a failed one of the first and second feeder bus-bars, a third one of said protection and control devices coordinating system functionality including causing switchgear connected to the failed active feeder bus-bar to open so as to disconnect an electric load from the failed feeder bus-bar and to connect the electric load to an unfailed one of the first and second feeder bus-bars,
   wherein the third one of said protection and control devices comprises a processor running computer code which includes:
   a software architecture comprising a first software part and a second software part that are run in parallel with each other,
   said first software part being cyclically executed, said second software part being an event-driven process performed in responsive to external events and run asynchronously with respect to said first software part,
   said second software part comprising a run-time procedure for assigning an execution priority to the external events of said second software part and to cycles of said first software part.

2. The High Speed Transfer System of claim 1, wherein said first and second Protection and Control devices communicate with said third Protection and Control device via an optical cable.

3. The High Speed Transfer System of claim 1, further comprising a digital communication channel operatively connected to allow a service communication among the three Protection and Control devices.

4. The High Speed Transfer System of claim 1, wherein each of said first, second and third Protection and Control devices comprise a human-machine interface.

5. An electrical distribution switchboard comprising the High Speed Transfer System of claim 1.

* * * * *